May 9, 1967

M. CAMRAS 3,318,997

VIDEO RECORDING AND REPRODUCING SYSTEM WITH PHOTOCONDUCTIVE SWITCHING OF TRANSDUCING ELEMENTS

Filed Oct. 7, 1963

2 Sheets-Sheet 1

INVENTOR.
MARVIN CAMRAS
BY
Hill, Sherman, Meroni, Gross & Simpson
ATTORNEYS

INVENTOR.
MARVIN CAMRAS
BY
Hill, Sherman, Meroni, Gross & Simpson
ATTORNEYS

United States Patent Office 3,318,997

Patented May 9, 1967

3,318,997

VIDEO RECORDING AND REPRODUCING SYSTEM WITH PHOTOCONDUCTIVE SWITCHING OF TRANSDUCING ELEMENTS

Marvin Camras, Glencoe, Ill., assignor to IIT Research Institute, Chicago, Ill., a corporation of Illinois Filed Oct. 7, 1963, Ser. No. 314,327
42 Claims. (Cl. 178—6.6)

This invention relates to a multiple channel recording and/or a playback system and particularly to an electronic image recording and playback head for recording and reproducing with the use of a scanning electron beam.

Present commercial magnetic video recorders utilize a mechanical scanning system wherein a series of magnetic heads rotate in a plane disposed transversely to the direction of movement of a magnetic record tape so that each head moves across the width of the tape in succession in scanning contact therewith. Such mechanical scanning systems have the disadvantage of rapid wear of tape and heads.

An electron beam scanning system is proposed in my U.S. Patent No. 2,900,443, issued Aug. 18, 1959, which provides greatly reduced wear since this system utilizes a series of stationary head units disposed across the width of the magnetic tape instead of moving heads. Experimental work with the electron beam scanning system is discussed in a paper entitled "Experiments With Electron Scanning for Magnetic Recording and Playback of Video," presented before the Institute of Radio Engineers in March 1963 and published in the IEEE Transactions on Audio, May-June 1963. As discussed in this paper, one of the most difficult problems from the constructional standpoint is the sealing of the multiplicity of fine wires which conduct the beam current from the interior of the special electronic tube to the respective head units at the exterior of the tube.

Video recorders have also been proposed involving distribution of the video signal over a series of channels of a magnetic record medium by means of electronic switching with individual gating circuits and the like for each channel, but such systems have been too complex and expensive to supplant mechanical video recorders.

It is an important object of the present invention to provide an electronic type recording and playback system which does not require the conducting of electric signal currents or magnetic signal fields through a wall of an electronic tube and yet which avoids the need for individual gating circuits and the like in association with each of the transducer head units.

Another object of the invention is to provide an electronic type area recording and/or playback system of simplified construction and reduced cost.

A further object of the invention is to provide a single electronic transducer assembly capable of both recording and playback operation.

Still another object of the present invention is to provide a simple and economical electronic type of magnetic recording and playback system capable of being constructed largely from readily available components.

A still further object of the invention is to provide a multiple channel magnetic transducer head capable of manufacture by greatly simplified procedures.

Yet another object of the invention is to provide an improved method of making a multiple channel transducer head comprising a series of head units having individual windings coupled therewith.

Still another and further object of the present invention is to propose an improved video recording and playback system capable of transducing television signals having a line rate of the order of 15,750 cycles per second with reduced head and tape wear as compared to present mechanical systems.

A feature of the present invention resides in the provision of a radiant energy coupling between a modulated scanning beam within an electron tube and a series of transducer head units exterior to the tube with the radiant energy being transmitted through a structural wall of the tube and varying in intensity in accordance with the signal to be recorded.

Another feature of the invention resides in the provision of a playback head wherein a scanning beam within an electronic tube controls the sequential activation of a series of head units exterior to the tube by means of a radiant energy coupling between the scanning beam and a series of radiant energy responsive switch elements in series with the windings of the respective head units.

A further feature of the invention resides in the provision of a multiple track magnetic head assembly having a magnetic core part on which a series of individual windings may be wound simultaneously by rotation of the magnetic core.

While it is contemplated that the present invention is particularly advantageous in recording and reproducing signals on a magnetic record medium, it will be apparent that the system is directly applicable to other modes of recording such as electrostatic recording as disclosed in my U.S. Patent No. 3,040,124, issued June 19, 1962.

Other objects, features and advantages of the present invention will be apparent from the following detailed description taken in connection with the accompanying drawings, in which.

Figure 1:
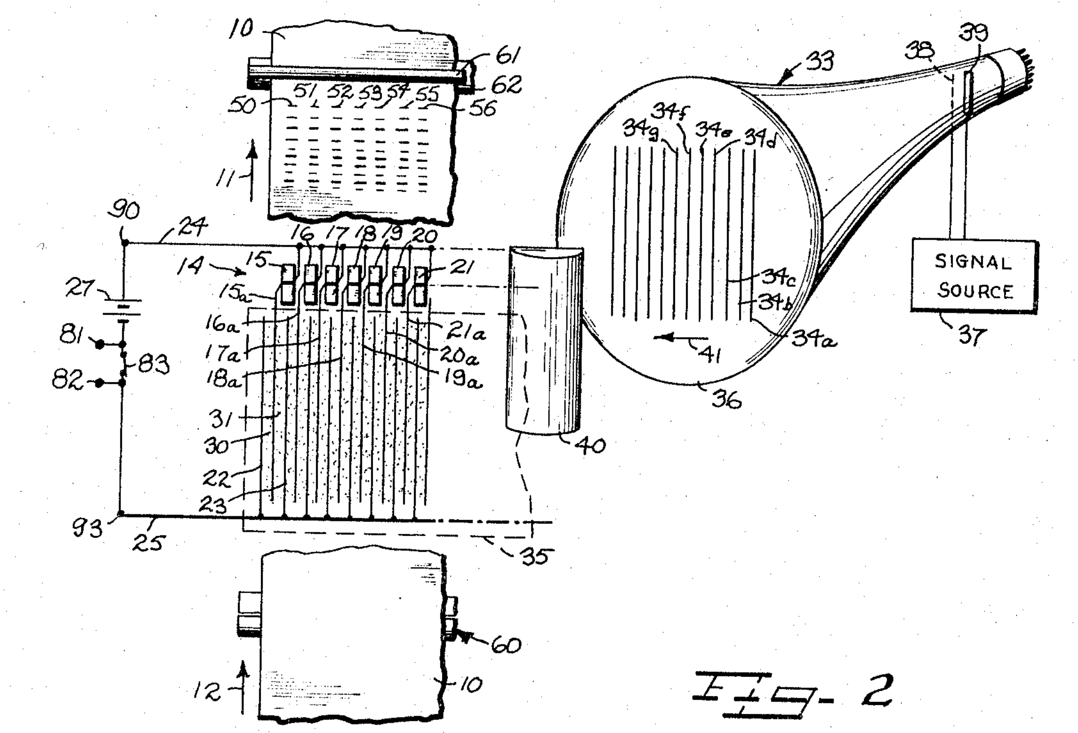
FIGURE 1 is a composite diagrammatic view illustrating a magnetic recording system in accordance with the present invention.

FIGURE 1 illustrates a magnetic recording system in accordance with the present invention. In this system, a magnetic tape 10 is moved in the direction of arrows 11 and 12 at constant speed past a magnetic transducer head assembly indicated generally by the reference numeral 14. The transducer head assembly comprises a series of magnetic head units such as indicated at 15–21, each comprising a pair of pole portions having tape contacting surfaces engaging the active undersurface of the magnetic tape 10 and separated by a non-magnetic gap.

Each of the head units 15–21 is coupled with an electric circuit comprising conductor parts such as **15*a*–21*a*. The conductors 15*a*–21*a* are indicated as being coupled with the respective head units 15–21 and being connected to a bus bar 24 while further conductors such as 22 and 23 are indicated as being spaced from the conductors 15*a*–21*a* and connected to a bus bar 25. The conductors 15*a*–21*a* may link the head units with a single turn or with multiple turns in the form of a coil or winding encircling a portion of the magnetic core of the head unit. A current supply means is indicated at 27 for establishing a potential difference between the bus bars 24 and 25. In the illustrative embodiment, the spaces between the successive conductor pairs extending from bus bars 24 and 25 are occupied by photoconductive material such as indicated at 30 and 31. By way of example, the recording system may further comprise a cathode ray tube 33 for generating successive line type light images such as indicated at 34*a*–34*g* suitable for activating the photoconductive material such as indicated at 30 between the successive conductor pairs such as 15*a* and 22 in sequence. A suitable lightproof enclosure is indicated at 35 for enclosing the fluorescent face 36 of cathode ray tube 33 and the target of photconductive material such as indicated at 30. In the illustrated embodiment, the greatest practicable amount of light emitted by the fluorescent face 36 may impinge on only a single photoconductive region such as indicated at 30 or on a pair of such regions as 30 and 31** at a given instant of time.

By way of example, the signal to be recorded may be supplied from a signal source 37 to the control grid 38 of the cathode ray tube 33 to modulate the intensity of the electron beam within the cathode ray tube so as to correspondingly modulate the intensity of the light image directed onto each of the photoconductive regions such as 30.

For increasing the light output from the cathode ray tube, the cathode ray beam may be broadened in the vertical direction by a very high frequency vertical sweep or preferably by the use of a beam of sheet configuration such as is produced by a cathode indicated at 39 within the cathode ray tube of elongated vertical dimension corresponding to the vertical dimension of the photoconductive material such as indicated at 30. The photoconductive regions may be arranged on the fluorescent face 36 of the cathode ray tube directly, or a lens such as the cylindrical lens indicated at 40 may be used between the tube face 36 and the regions of photoconductive material such as indicated at 30 for fine line focus of the light energy on the successive photoconductive regions such as 30, or for accommodating a different size of photoconductive regions as compared with the lines of light energy such as indicated at **34*a*–34*g* produced on the face 36** of the cathode ray tube.

The pattern of magnetization of the tape 10 (at the undersurface thereof) has been indicated in FIGURE 1. Thus, if the scanning beam of the cathode ray tube 33 moves from right to left as viewed in FIGURE 1 as indicated by the arrow 41 during its active sweep, head unit 15 is first energized when the scanning beam is producing a fluorescent output such as indicated at **34*a* on the face 36. If a lens such as 40 is not used then the scanning direction of the cathode ray beam will be opposite to that indicated by the arrow 41 in order to sequentially energize the head units 15–21. The light energy may impinge successively on regions of photoconductive material such as indicated at 30 and 31 located respectively between conductor 22 and conductor 15*a* and between conductor 15*a* and conductor 23. The photoconductive material at regions 30 and 31 when illuminated exhibits a relatively low impedance, and current supply 27 produces an activating current in the electric circuit extending from bus bar 24 through conductor 15*a*, through conductors 22 and 23 to bus bar 25. By way of example, the intensity of the electron beam in the cathode ray tube 33 may be modulated in accordance with the signal to be recorded so that the head unit 15 will produce a recorded field such as indicated at 50 on the magnetic tape 10 having an intensity in accordance with the value of the signal to be recorded at the instant that the electron beam is producing the light image indicated at 34*a***.

At a succeeding instant of time, the electron beam of the cathode ray tube 33 is producing a light image as indicated at **34*b* at the fluorescent face 36. Correspondingly, the regions of photoconductive material on either side of conductor 16*a* may be illuminated so as to provide for activation of the head unit 16. The intensity of the recorded trace indicated at 51 and produced by the head unit 16 will reflect the instantaneous intensity of the signal supplied from signal source 37 to the control grid 38 of the cathode ray tube 33. Similarly, when the electron beam of the cathode ray tube is producing successive light images as indicated at 34*c*–34*g*, head units 17–21** respectively will be activated.

It will be understood that a group of seven head units has been illustrated solely by way of example, and that the number of head units may be selected in accordance with the desired application. For example, there might be sufficient head units to record a line of a television signal with adequate resolution. The decay time or screen persistence of the fluorescent face 36 should be related to the scanning rate of the series of head units such as 15–21 so that the first head unit 15 will be deactivated at the beginning of a further cycle. Thus, in the case of a television signal having a line frequency on the order of 15,750 cycles per second, the fluorescent material at end wall 36 should have a decay time or screen persistence on the order of $\frac{1}{15,000}$ second or less so as to be ready for the next sweep, although a slower decay with some blurring might be tolerable. Similarly the decay of photoconductivity of the photoconductive material must be fast enough so that a given region such as indicated at 30 will be ready for the next sweep of the scanning beam of the cathode ray tube $\frac{1}{15,750}$ second later. Satisfactory pictures may be obtained where decay in the conductivity of the photoconductive regions such as 30 to 10% of maximum conductivity occurs within $\frac{1}{15,750}$ second, but the rate of decay of the fluorescent face and photoconductive regions may vary over a wide range depending on conditions of use.

The magnetic fields recorded by the successive head units 15–21 have been indicated at 50–56 for a single scan of the electron beam of cathode ray tube 33. When the electron beam of the cathode ray tube is scanned across the tube face cyclically at a rate synchronized with the line rate of a television signal, the successive head units such as 15–21 will record columns of magnetic fields extending in the direction of movement of the tape as indicated in FIGURE 1. The successive magnetic fields on the tape such as represented at 50–56 will vary in intensity in accordance with the variation in the signal intensity to be recorded.

A magnetic head is indicated at 60 having a longitudinal gap which extends for the entire width of the magnetic tape 10. The head 60 may constitute an erase head energized by high frequency alternating current or may constitute a direct current erasing head for saturating the tape in the longitudinal direction, after which the tape can be biased to a desired operating point, as for example by the average direct current from source 27 through the energizing electric circuits **15*a*–21*a* of the head units 15–21, or by the use of a separate biasing winding linking all of head units 15–21** in common. Alternatively, alternating current high frequency bias can be employed.

The reference numerals 61 and 62 diagrammatically indicate a tape driving means for driving the tape in the direction of arrows 11 and 12, for example at constant speed, or in synchronism with the horizontal line rate of a video signal being recorded during the recording process.

Figure 2:
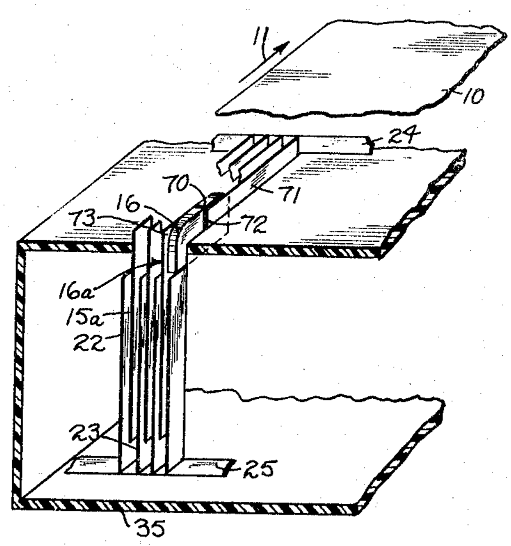
FIGURE 2 is a fragmentary perspective view illustrating details of one form of transducer system in accordance with the embodiment of FIGURE 1.

FIGURE 2 illustrates details of an embodiment in accordance with the general system of FIGURE 1 where the electric circuits extend through the gaps such as indicated at 70 of the head units such as 16, and link the head units with only a single turn. The conductors such as **16*a* are indicated as comprising thin strips of conductive material of rectangular cross section having first length portions such as 71 connected to the bus bar 24, second length portions such as 72 extending through the gap 70 and third length portions such as 73 extending in a plane generally parallel to the direction of tape travel indicated by the arrow 11. The conductors such as 22 and 23 connected with the bus bar 25 are also indicated as being of strip conductive material of rectangular cross-section and relatively thin in comparison with the thickness of the head units such as indicated at 16. The photoconductive material separating the successive conductors such as indicated at 30 and 31 may be in the form of rectangular blocks with respective rear faces exposed to the scanning light beam generated by the cathode ray tube 33. By way of example, the enclosure 35 has been illustrated as being provided with slots receiving the successive head units and the associated conductor length portions such as 73. The slots are of course sealed so as to prevent entrance of light to the interior of the enclosure 35. Within the enclosure 35 is located the photoconductive material such as indicated at 30 and 31 and the end face 36 of the cathode ray tube 33 so that illumination of the photoconductive material from sources exterior to the enclosure 35 is prevented. Where the photogrid is in contact with the scanning tube face 36, or a lens system such as indicated at 40 is not used, optically conductive fibers may be utilized to keep the light from dispersing and to concentrate it on the desired regions such as indicated at 30 and 31**.

By way of example, the head cores such as indicated at 16 may be made of "Permalloy" having a composition of 4% molybdenum, 79% nickel and the remainder iron and impurities. By way of example, with a single length of conductor such as indicated at 72 in FIGURE 2 linking the gap of each of the head units such as 16, a momentary peak current of about .1 ampere is required to activate the head unit. This is readily obtained from cadmium sulfide or cadmium selenide which in this configuration may have an illuminated resistance of less than 100 ohms and a dark resistance in the megohm range. Proportionately less current is needed for heads having multiple turn windings on the head units. The non-magnetic gap 70 may have a dimension in the scanning direction of 0.0005 inch which is provided by making conductor length portion 72 of non-magnetic material having a thickness of 0.0005 inch. Thicknesses from 0.00004 to 0.001 inch may be used. The conductor portions 71 and 73 preferably curve downwardly from gap conductor portion 70 so that bus bar 24 and the upper edge of conductor portions 71 and 73 are substantially spaced below the path of the tape 10. Alternatively the arrays of FIGURES 1, 2 and 3 may be made by printed circuit or photo-etching techniques.

Instead of modulating the intensity of the cathode ray beam at the control electrode of the cathode ray tube 33, the video signal may be supplied at terminals 81 and 82 in FIGURE 1 upon opening of a switch 83, and making the voltage of source 27 equal to zero unless bias is desired. In this mode of operation the beam is swept horizontally but is unmodulated except for being extinguished during the return sweep. While not considered preferable, it would also be possible to apply the video signal to all of the head units by means of a common winding linking each of the head units separately from the conductors 15*a*–21*a*. The signal supplied by such a common signal winding linking all of the head units would not in itself be sufficient to produce an effective recording on the magnetic tape 10, but the recording would become effective when a head unit was activated upon energization of the associated electric circuit such as 15*a*–21*a* by means of the light beam such as represented in its successive positions by lines 34*a*–34*g* in FIGURE 1, the activation being accomplished when the currents in conductors 15*a*–21*a* supplied the correct bias to the respective head units, or set a control winding to the operating point.

Figure 3:
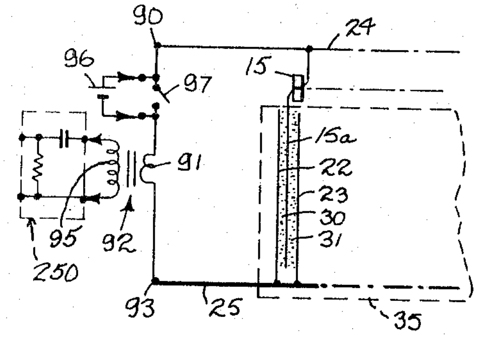
FIGURE 3 is a fragmentary diagrammatic view illustrating the system of FIGURE 1 as applied to playback operation.

FIGURE 3 illustrates the head of FIGURE 1 connected in a circuit for playing back a recording on the tape 10 such as produced by the system of FIGURE 1. During playback, the recorded tape 10 is moved over the series of head units such as indicated at 15 in the same direction as during recording operation. The cathode ray tube electron beam is scanned across the fluorescent face 36 in synchronism with the signal recorded on the tape. For this purpose, horizontal synchronizing signals may be recorded along one margin of the tape 10 and reproduced during playback to control the sweep of the electron beam of cathode ray tube 33. The speed of the tape drive system represented at 61 and 62 in FIGURE 1 may also be controlled during playback mode so that the successive head units such as 15–21 are exactly registered with the respective recorded fields such as indicated at 50 and 56 at the respective instants of activation of the successive head units during the playback operation. As a given recorded field such as indicated at 50 on the tape 10 moves into registration with the gap of the associated head units such as 15, a voltage is induced in the associated conductor 15*a* which is a function of the maximum magnetic field intensity recorded at the portion 50 of the tape 10. When a given electric circuit is activated by means of the light beam impinging on the associated photoconductive material such as indicated at 30 and 31 in FIGURE 3, an effective electric circuit is completed through bus bar 24, terminal 90, primary 91 of output transformer 92, terminal 93 and bus bar 25 to induce an output voltage at the secondary 95 of transformer 92 which is the function of the instantaneous signal on the tape 10. If necessary a bias supply may be connected as indicated at 96 and switch 97 opened. A load resistor may be substituted for the transformer 92 in the output circuit. The output from the transformer 92 or load resistor will be an electric signal which is a function of the electric signal supplied to the control electrode 38 of the cathode ray tube 33 during the recording operation. The electron beam of the cathode ray tube is, of course, not modulated in intensity during the playback operation. The electron beam may be broadened in the vertical direction as viewed in FIGURE 1 by a very high frequency sweep applied to vertical deflection electrodes or preferably by the use of a vertically elongated beam such as represented by the lines 34*a*–34*g* in FIGURE 1. While head units with windings are shown, Hall-effect or other flux sensitive types of units may be used. Hall-effect head units are illustrated in a pending application U.S. Ser. No. 644,641, filed Mar. 7, 1957, and assigned to the assignee of the present application.

The photoconductive grid assembly may be formed as indicated in FIGURE 2 by stacking strips of conductive material with blocks of photoconductive material, or the grid may be formed by photoetching and evaporation techniques. Multi-turn coils may be formed on the successive head units 15–21 and the multiple turn coils may be automatically fabricated, enabling a closer match between head and photo-grid impedance for improved efficiency, and in some cases eliminating the matching transformer 92 during the playback operation.

FIGURES 4 through 7 illustrate details of a preferred embodiment of the system generally indicated in FIGURES 1 and 3.

Figure 4:
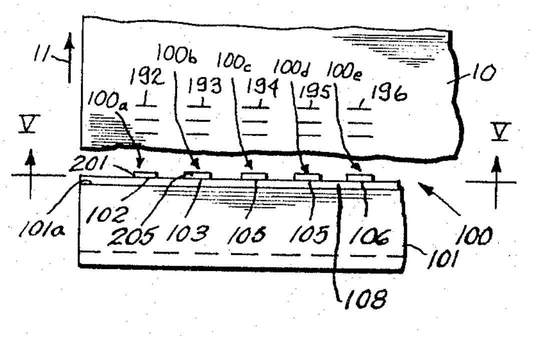
FIGURE 4 is a fragmentary somewhat diagrammatic plan view of a preferred magnetic recording and playback system in accordance with the embodiment of FIGURE 1.
Figures 5, 6:
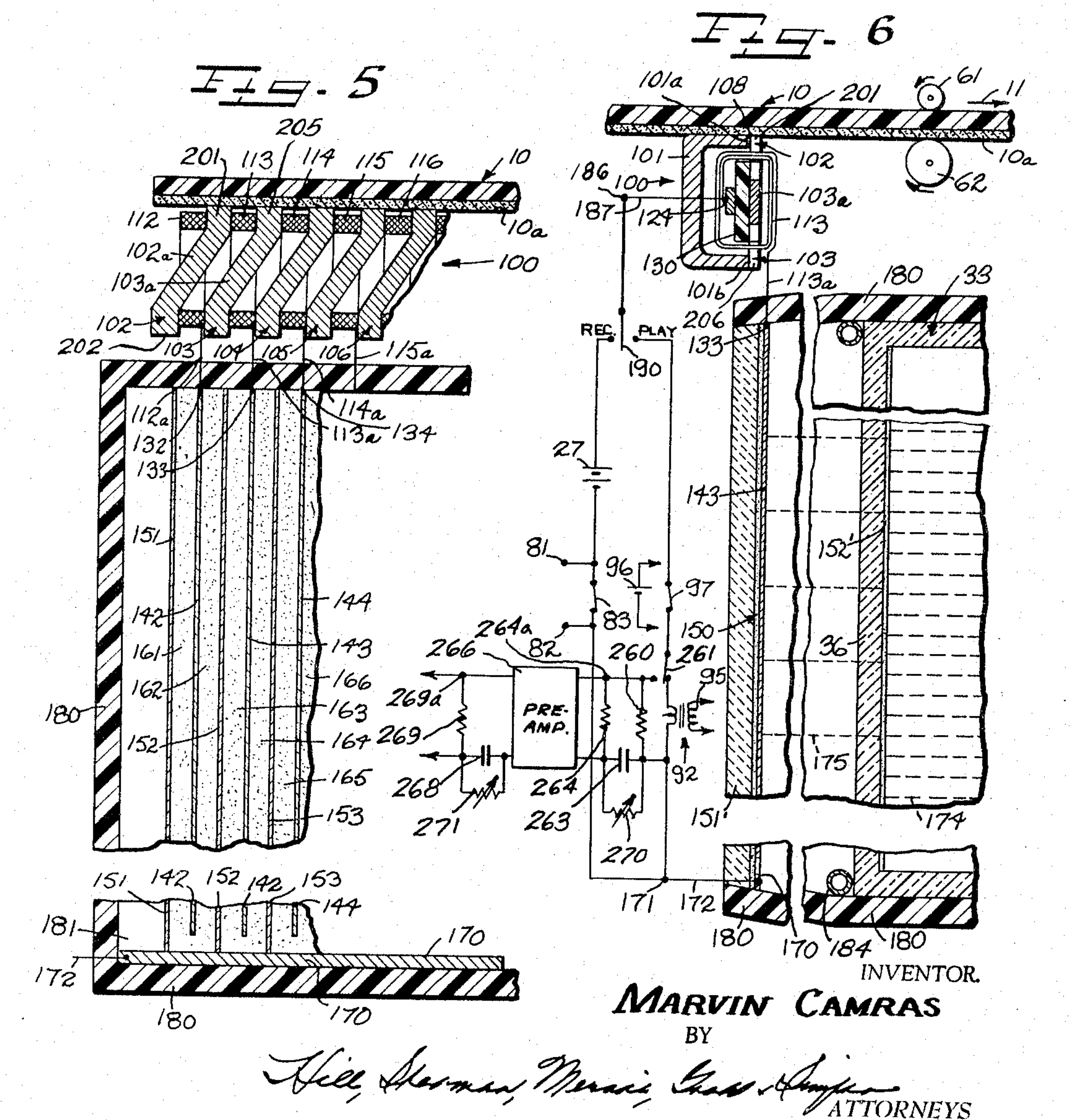
FIGURE 5 is a fragmentary somewhat diagrammatic vertical sectional view taken generally along the line V—V of FIGURE 4.
FIGURE 6 is a fragmentary diagrammatic vertical sectional view taken generally in the direction of tape movement and at right angles to the sectional view of FIGURE 5.

In the embodiment of FIGURES 4–7, the magnetic tape 10 is moved in the direction of the arrow 11 at constant speed. A magnetic transducer head assembly indicated generally by the reference numeral 100 comprises a series of magnetic head units such as indicated at 100*a*–100*e* in FIGURE 4. The head units are formed by means of a common core part 101 and a series of individual core parts such as indicated at 102–106, FIGURE 5. Each of the transducer head units comprises a pole portion provided by one of the core parts 102–106 and having a tape contacting surface as seen in FIGURE 4 engaging the active undersurface of magnetizable layer 10*a* of the magnetic tape 10 and separated from the common polar edge face 101*a* of common core part 101 by a non-magnetic gap defined by the non-magnetic gap spacer 108. The gap spacer 108 may, of course, comprise a non-magnetic electrically conductive material deposited on the edge face 101*a*, FIGURE 6, of the core part 101 or may comprise a separate strip of electrically conductive non-magnetic material, in either case having a thickness of the order of 0.0001 to 0.001 inch or less for example. The end face 101*b* of the core part 101 remote from the active layer 10*a* of the tape 10 may also be continuous for the entire length of the core part 101 and may be in direct contact with the lower ends of the core parts such as 102–106 as indicated in FIGURE 6 for the core part 103.

The head units 100*a*–100*e* are coupled with respective electric circuits including electric windings 112–116. Each of the windings encircles a diagonally extending portion of the core parts 102–106, the diagonally extending portion of core parts 102 and 103 being designated by the reference characters 102*a* and 103*a*. The windings such as winding 113 indicated in FIGURE 6 which links diagonally extending portion 103*a* thus may each be located generally in a vertical plane at right angles to the active surface of the tape as indicated in FIGURE 5. This core construction facilitates simultaneous winding of the core parts 102–106 as will hereinafter be described.

As indicated in FIGURE 6, one end of each of the windings 112–116 is connected with a bus bar 124 which extends for the entire length of the magnetic transducer head assembly 100 (which length approximately equals the width of the magnetic tape 10). The bus bar 124 and the successive core parts 102–106 are carried by an elongated support strip 130 of electrically non-conductive non-magnetic material which also extends for the length of the transducer head assembly 100. The supporting strip 130 is preferably of rigid construction so as to provide support for the relatively thin core parts 102–106. The windings 112–116 may be formed simultaneously by connecting one end of each of a series of wires to the bus bar 124 and then rotating the assembly comprising the bus bar 124, supporting strip 130 and core parts 102–106 on the central longitudinal axis of the supporting strip 130 to wind the wires as coils in the spaces between the successive core parts 102–106. The wires forming the windings 112–115 have been indicated at 112*a*–115*a* in FIGURE 5, and the wires have been indicated as being conductively connected at points such as 132–134 to vertically elongated conductors such as 142–144 respectively. The conductors such as 142–144 are preferably disposed in overlying relation to a layer of photoconductive material indicated generally by the reference numeral 150 in FIGURE 6 which in turn is deposited on a plate 151′ of electrically non-conductive material which is opaque to light of the wavelengths to which the photoconductive material is responsive. By way of example, the plate 151′ may be of a rigid ceramic material. The photosensitive layer 150 may have an area corresponding to the active area of the fluorescent coating 152′ on the end wall 36 of the cathode ray tube 33, FIGURE 6, which is to be scanned by the cathode ray beam 174. The conductors 142–144 along with conductors 151–153 are preferably deposited on the photoconductive layer 150 by evaporation through a photoetched mask. Alternatively the layer 150 may be formed by printing, silk screening, and the like. The conductors such as 142–144 and 151–153 divide the photoconductive layer 150 into successive regions such as 161–166 to form a photo-grid entirely analogous to that illustrated diagrammatically in FIGURE 1. The conductors 151–153 are connected to a common bus bar 170 which in turn is diagrammatically indicated in FIGURE 6 as being connected with a terminal point 171 by means of a conductor 172.

The dash lines 174 in FIGURE 6 represent an instantaneous position of the scanning electron beam within the cathode ray tube 33 and may be considered as representing the instant of time when the electron beam is causing light energy such as indicated at 175 in FIGURE 6 to impinge on the photoconductive region 163 shown in FIGURE 5. A suitable lightproof enclosure is indicated at 180 for enclosing the region between the end wall 36 of the cathode ray tube 33 and the target of photoconductive material indicated at 150 in FIGURE 6. In the illustrated embodiment, the majority of collected light emitted by the fluorescent layer 152′ may impinge on only a single photoconductive region such as indicated at 163 at a given instant of time.

It will be understood that the showing in FIGURE 5 is of a diagrammatic nature and that there might be 200 or more regions such as indicated at 161 along a distance corresponding to the radius dimension of the tube end face 36. The view of FIGURE 5 may be thought of as a vertical sectional view taken through the layer 150 with portions of the layer 150 broken away to show the conductor parts 142–144 and 151–153 in section. Where the photoconductive grid is broken away in FIGURE 5, the lens 40 would be visible but the lens 40 has not been shown in FIGURE 5 in order to avoid complicating this view. The photoconductive grid including material 150 and conductors such as 142–144 and 151–153 might define a square area having a length on each side of 2.5 inches. For the case where a total of 250 head units is to be utilized, there would be 500 photoconductive regions such as indicated at 161–166 successively exposed to light energy such as indicated at 175 in FIGURE 6.

A uniform intensity of light energy may be directed over the entire area of the photoconductive grid so as to bias the photoconductive material to a desired operating level. A source of light for this purpose has been diagrammatically indicated at 184 and may be of circular configuration such as a circular fluorescent lamp. The lamp 184 would be located where it will give uniform illumination of the photoconductive regions such as 161–166, taking into account the presence of lens 40 in the illustrated embodiment.

The electric circuits of the respective head units may be connected to recording and playback circuitry such as indicated in FIGURES 1 and 3, and corresponding reference numerals have been applied to similar parts in FIGURES 1, 3 and 6. As indicated in FIGURE 6, the bus bar 124 may be connected with a terminal 186 by means of a conductor 187, and a selector switch 190 may selectively connect terminal 186 with the recording circuit including current source 27 and the playback circuit including the primary 91 of output transformer 92.

As has been indicated in FIGURE 1, the signal to be recorded may be supplied from a signal source 37 to the control grid 38 of the cathode ray tube 33 to modulate the intensity of the electron beam indicated at 174 in FIGURE 6 so as to correspondingly modulate the intensity of the light beam indicated diagrammatically at 175 in FIGURE 6 which impinges on the successive photoconductive regions such as indicated at 161–166 in FIGURE 5.

In place of the elongated cathode 39 indicated in FIGURE 1, which generates a sheet type electron beam, vertical deflection electrodes may be provided which are supplied with a very high frequency vertical sweep potential so as to broaden the cathode ray beam in the vertical direction as indicated at 174 in FIGURE 6. The range of vertical deflection of such a pencil type electron beam would at least correspond to the vertical height of the regions 161–166 (e.g. 2.5 inches) so that the fluorescent output from the cathode ray tube would excite the entire acitve region of the photoconductive grid. Instead of interposing a cylindrical lens such as indicated at 40 in FIGURE 5, the photo conductive regions may be arranged directly on the exterior surface of the end wall 36 of the cathode ray tube 33. Optical fibers may be used to concentrate the light as previously mentioned. The cylindrical lens 40 may be used between the tube face 36 and the regions of photoconductive material 161–166 for fine line focus of the light energy on the succesive photoconductive regions, or for accommodating a different size of photoconductive regions as compared with the instantaneous lines of light energy such as indicated at 34a–34g in FIGURE 1 produced on the face 36 of the cathode ray tube.

The pattern of magnetization of the magnetizable layer 10a of the tape has been indicated diagrammatically in FIGURE 4 as successive regions of magnetization such as 192–196 produced successively by the head units 100a–100e. A row of such lines of magnetization is produced across the tape by the successive head units during each successive horizontal sweep of the scanning beam 174.

The further details of construction and operation and alternatives described in connection with the system of FIGURES 1 and 3 are directly applicable to the embodiment of FIGURES 4–7 and such description is hereby incorporated with respect to the embodiment of FIGURES 4–7.

In each of the embodiments, cadmium sulfide, cadmium selenide, cadmium telluride, lead sulfide, lead selenide, lead telluride, gallium arsenide and gallium phosphide are examples of photoconductive materials which may be used. Photosensitive materials which generate voltage and current such as silicon, selenium, copper oxide, or similar barrier layer cells, and cells where a voltage is generated by the PEM effect are also applicable, in which case the energizing supply voltage indicated at 27 is not necessary unless used for forward bias, or reverse bias of the cells. The photosensitive array may also be formed as a set of photo-transistor or photo-diode junctions utilizing germanium, indium antimonide, or silicon to give inherent amplification, resulting in higher currents during recording and higher sensitivity during playback together with faster response than would otherwise be obtained. Where the signal is applied other than by modulation of the intensity of the electron beam 174, or where a "gray scale" in the signal is not important, the photosensitive regions may be of the triggered type, acting as on-off switches.

The most sensitive materials such as cadmium sulfide or cadmium selenide are also the slowest in response. In facsimile work they are completely adequate since the transmission rate may be about one picture per minute. The speed of response in such photoconductors can be increased by using very high illumination levels, by biasing the elements with background illumination as indicated at 184 in FIGURE 6, or by choosing a shorter wavelength of light excitation.

Faster response is secured with lead sufide or selenide, the n-type being faster but less sensitive than the p-type or intrinsic material. Gallium arsenide or phosphide give even faster speed. Speed is obtained however at the cost of sensitivity.

Silicon cells and photo-junction cells are extremely fast, but are more complex, or may have a disadvantageous spectral sensitivity.

As previously indicated, the speed requirement is not too great in recording. The response must be very fast for playback, however, particularly if standard television signals are to be reproduced with high resolution. Here the sensitivity can be sacrificed, and outputs of the order of a millivolt are adequate during playback as long as the signal to noise ratio is good. Different photo materials may be chosen, with relatively slow relatively sensitive semiconductors for recording, and relatively fast relatively insensitive ones for playback. The phosphor layer 152' of end face 36 of the cathode ray tube 33 must have intense output of a color matched to the spectral range of the photoconductor material. The speed of light decay of the phosphor should be very high for playback, but may be moderate for recording, for example providing a decay to 10% of its maximum excited intensity within $1/_{15,750}$ second. Fast decaying phosphors in cathode ray tubes are the P15, P16 and P24. These materials and a description of their characteristics are available from the RCA Corporation, for example. The P16 phosphor has maximum output at a wavelength of about 3650 angstroms which is in the near ultraviolet region. Cadmium sulfide materials were found to respond to the P16 phosphor with some mismatch, and with better speed than at longer wavelength light. Silicon cells were found to be relatively insensitive to the P16 phosphor, since their best sensitivity was near the wavelength of red or infrared light. The P24 phosphor has a peak response in the green portion of the spectrum (5100 angstroms) and its light is better matched particularly to cadmium sulfide and to many other photoconductors. The P15 phosphor is intermediate, with peaks of response at 3900 and at 5100 angstroms. Considerable variation is possible with special phosphor, or with special doping of the photoconductive material to bring its color of maximum response within the color output of the scanning tube phosphor.

By way of example, the scanning or electronic discharge tube 33 may be an RCA type 5AUP24 or National Video type 5BKPV24 cathode ray tube, swept horizontally with a saw tooth waveform at the desired line rate which might be 15,750 cycles per second for a television signal, or 15.75 cycles per second for slow rate facsimile. The vertical sweep applied to the vertical deflection electrodes of this cathode ray tube may be a 20 megacycle per second sine wave, or other frequency chosen to be above the highest picture frequency components. Both the horizontal and the vertical sweep amplitudes are set to give a pattern on the tube face 36 which is 2.5 inches square or at the maximum size at which distortion is not serious.

During recording the beam is intensity modulated by supplying the picture signal to the control electrode indicated at 38 in FIGURE 1. During playback, the control electrode 38 may receive a constant voltage so as to maintain the scanning beam 174 at a constant high brightness level consistent with fine resolution corresponding to the elements or regions 161–166 on the photo-grid. Alternatively the voltage supplied to control electrode 38 during playback may be at a controlled level to compensate for irregularities in the photo-grid and thus to switch the photoconductive region of each head unit electric circuit to the same level of conductivity as the other regions during the active intervals thereof.

During both recording and playback the beam is blanked out during the return portion of the sweep, for example by means of a blanking voltage supplied to the control electrode 38 by signal source 37. By way of example, the conventional composite video signal including the picture component and the horizontal and vertical blanking pulses may be supplied to the control electrode 38 during recording. The signal source 37 may include a suitable equalizer circuit for the picture component of the signal being recorded, for example to provide recorded field intensities on the record medium bearing substantially a linear relationship to the signal being recorded. The cathode ray beam 174 would, of course, be blanked out during the entire vertical blanking interval of a conventional composite video signal. Thus, the successive fields of the television signal recorded on the magnetic tape 10 will have a spacing therebetween in the direction of movement of the tape generally corresponding to the distance the tape travels during the vertical blanking intervals.

For the playback process, a suitable equalizer network would be connected across the terminals of the secondary winding 95 of transformer 92. The equalizers can be cascaded, but it is desirable to include at least a portion of the equalization in the later amplifier stages to reduce hum and noise. The equalizer may be selected to provide a six decibel per octave rise from 10 kilocycles per second to 5 megacycles per second, for example. Equalization from 3 to 12 decibels per octave was found to be useful over a frequency range from about one kilocycle per second to 10 megacycles per second.

In the example utilizing the RCA type 5AUP24 cathode ray tube, the photosensitive layer 150 is a cadimum sulfide coating with the active region of the coating having the same dimensions as the pattern on the scanner tube face 36. The coating is on an insulating backing 151' and is manufactured in a standard manner known to those skilled in the art, examples of companies in commercial production being Clairex Corporation of New York, N.Y., and RCA Corporation of Camden, N.J. The spectral response of the cadmium sulfide layer may peak at 5150 angstroms as is typical of Clairex type 5 material, matching closely the 5AUP24 phosphor peak of 5100 angstroms.

For faster response, the Clairex type 3 cadmium selenide may be chosen. Although this is most sensitive at 7350 angstroms it has considerable sensitivity in the 5000 to 7000 angstrom region where the P24 phosphor gives reasonable output. Thus the spectral peak of light from the P24 phosphor (5100 angstroms) is of shorter wavelength than the spectral peak in sensitivity of the type 3 cadmium selenide (7350 angstroms).

Figure 7:
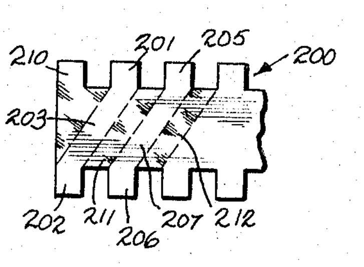
FIGURE 7 is a partial elevational view illustrating a step in the formation of the preferred magnetic head assembly for use in the system of the present invention.

Over the photoconductive coating which may be cadmium sulfide or calmium selenide, a metallic grid of indium metal as indicated at 142–144 and 151–153 is placed, for example by evaporation through a thin photoetched mask, or by printing, silk screening, and the like. For the head described below, the grid would have 250 elements such as indicated at 151–153 connected to the lower bus 170 and 250 elements such as indicated at 142–144 in between the elements such as 151–153. As illustrated in FIGURE 5, the grid elements such as 142–144 are electrically fastened to the respective windings such as 112–116 of the head units **100*a*–100*e*, as for example by microsoldering with indium at points such as indicated at 132–134, or by connecting the grid elements and windings with a commercial conductive silver cement. The "comb" part 101 of the magnetic head core assembly is preferably formed from a sheet such as indicated at 200 in FIGURE 7 of "Permalloy" having a composition of 4% molybdenum, 79% nickel and the remainder iron and minor constituents, the sheet having a thickness of .002 inch, a height of .125 inch and a length of two inches. If the teeth such as indicated at 201 and 202 in FIGURE 7 are .004 inch wide and separated by a space having a length of .004 inch, the sheet 200 may be sub-divided into a series of about 250 core parts such as indicated at 102–106 in FIGURE 5 by removing the portions such as indicated by shading at 210–212 in FIGURE 7. It will be understood that the upper edge face of tooth 201 will correspond to the upper edge face of core face 102 which is visible in FIGURE 4 and both reference numerals have been applied in FIGURE 4. The diagonal portion indicated at 203 in FIGURE 7 connecting the teeth 201 and 202 will correspond to the diagonal portion 102*a* indicated in FIGURE 5. Similarly, teeth 205 and 206 together with diagonal portion 207 indicated in FIGURE 7 will provide the core part 103 of FIGURE 5 after removal of the regions indicated by the sectioning at the opposite sides of the diagonal portion 207. The core strip 200 is preferably secured to the supporting strip 130, FIGURE 6, before the shaded portions thereof such as indicated at 210, 211 and 212 in FIGURE 7 are removed. The windings 112–116 preferably contain 50 to 100 turns of fine wire (e.g. No. 50 to No. 56 A.W.G.) such as indicated at 112*a*–115*a* in FIGURE 5. The inner ends of the wires such as 112*a*–115*a* are connected to bus bar 124, FIGURE 6, and then gang wound by rotation of support member 130 on its central longitudinal axis as previously described. The support member 130** may be of glass fiber impregnated epoxy material.

It may be noted that while a particular direction of tape movement has been indicated in FIGURES 4 and 6, in an actual operating system the tape would probably be driven in the direction opposite to the direction of arrow 11 so as to cross the individual pole parts **100*a*–100*e* first and then to cross the pole of common core part 101**.

The current in the successive windings 112–116 during recording may be of the order of one to five milliamperes in order to produce desirable signal levels on present day standard audio recording tapes. With such recorded signal levels on standard audio tapes, the playback output voltage from the windings will be of the order of 0.5 millivolt. The small electric current required in the successive windings during recording leaves ample margin for losses in the photoconductive system. For playback at the facsimile rate the same cadmium selenide materials as just described for recording have a sufficiently fast response; but at standard television rates a faster responding and less sensitive photomaterial may be required and this will still be adequate for recording because the head winding current requirements are small.

The biasing light level supplied by the light source indicated at 184 in FIGURE 6 may be of longer wavelength than the exciting light indicated at 175. For example, the source 184 may produce light which is filtered to transmit long wavelengths which have the effect of shortening the response time of the photoconductive material 150. The overall illumination from the bias source 184 may be in the form of infrared radiation or heat radiation which speeds the release of trapped charges, decreasing the sensitivity of the photoconductive material 150, but making the response faster.

In another arrangement a conductive area on the back side of the photoconductive layer 150 might be used for the common connection in place of bus bar 170 and conductors 142–144. With this arrangement only the set of independent grid wires 151–153 would be present at the front side of the photo-grid on which the light energy indicated at 175 in FIGURE 6 impinges. This would reduce the number of grid wires by a factor of one-half for a given number of head units, but isolation between the head unit electric circuits would be reduced.

As a further alternative, the photoconductive materials such as indicated in FIGURES 1–3 and 5 and 6 may be activated directly by electron impingement on the sensitive surface instead of utilizing light radiation; or other non-visible radiation may be used to excite the photo-responsive materials.

Cadmium sulfide and cadmium selenide have been considered to be far too slow in response to anticipate that they could be used successfully in the system of the present invention for recording and playback of standard television signals. The following are the published rise and decay times for Clairex type 7 cadmium sulfide and type 3 cadmium selenide.

| Material | Light Level Foot Candles | Time Constant (to 63% of Final Level) | |
|---|---|---|---|
| | | Rise (seconds) | Decay (seconds) |
| Cadmium Sulfide | 0.01 | 1.1 | 0.12 |
| Do | 100 | 0.002 | 0.005 |
| Cadmium Selenide | 0.01 | 0.29 | 0.03 |
| Do | 100 | 0.001 | 0.002 |

A rise or decay time of .001 second corresponds to a useful alternating current frequency of about 250 cycles per second which has generally been considered the order of upper frequency limit of these sensitive cells even at high light levels.

In connection with the present invention it has been discovered that under certain conditions such photo-sensitive cells can be made to have useful response at frequencies 1000 to 10,000 times greater than the previously accepted limits. These conditions correspond to the examples given in the present specification. With an equalization in the playback circuits corresponding to a rise of approximately six decibels per octave from 10 kilocycles per second to 5 megacycles per second an excellent video picture was reproduced of a pattern scanned by a type 5BKPV–1 cathode ray tube flying spot scanner having P16 phosphor. The modulated light from the flying spot scanner was picked up by Clairex 807 or 505L cadmium sulfide cells, or Clairex 803 cadmium selenide cells. The cells were energized in a series circuit including a bias source such as indicated at 96 in FIGURE 6 consisting of a 45 volt battery and a 4000 ohm load resistor in place of the transformer 92 (with the negative terminal of the battery grounded). The output was taken from across the load resistor and fed into an RC equalizer such as indicated at 250 in FIGURE 3 having a series capacitor of 50 micro-microfarads followed by a shunt resistor of 4000 ohms having one terminal connected to ground. Another RC equalizer section was used after the preamplifier with 25 micromicrofarads in series followed by a 2000 ohm resistor in shunt to ground. For adjustment of low frequency response, resistors of 25,000 to 50,000 ohms were connected across each capacitator. Equalization from 3 to 12 decibels per octave was found to be useful over a frequency from about one kilocycle per second to 10 megacycles per second. The equalizer circuits can be cascaded, but it is desirable to include at least a portion of the equalization in the later amplifier stages to reduce hum and noise. After equalization the signal to noise ratio was adequate for excellent video reproduction.

The mechanism of this fast response time which has been determined experimentally is not fully understood, but it is believed that the photoconductor regions operate in a different mode from that during normal usage. The fast response mode is also useful for other applications, for example the reproduction of light modulated at audio frequencies to 20 kilocycles per second where other devices are presently used.

The following Example I is a specific presently preferred example of materials to be utilized in the embodiment of FIGURES 4–7 where the system is to carry out a recording function with respect to standard television signals.

*Example I*

(1) National Video type 5BKPV24 cathode ray tube having a radiation emitting layer 152 of P24 phosphor.

(2) Radiation responsive layer 150—Clairex type 5 cadmium sulfide material.

The following Example II is the presently preferred example for a playback system for standard television signals.

*Example II*

(1) National Video type 5BKPV–1 cathode ray tube which has a P16 phosphor.

(2) Radiation responsive material 150—cadmium selenide, Clairex type 3 material.

Where the same system is to be utilized both for recording and playback of standard television signals, the following Example III gives the presently preferred components.

*Example III*

(1) National Video type 5BKPV24 cathode ray tube with P24 phosphor.

(2) Radiation responsive material 150, cadmium selenide, Clairex type 3 material.

For the case of recording and playback of facsimile signals having a line rate of the order of 15.75 cycles per second, for example, the presently preferred example corresponds to Example I above.

In each of the foregoing examples I through III the other parameters are as in the preferred embodiment described preceding said examples. The other preferred conditions may be summarized as follows:

(1) Magnetic record tape 10—standard type of commercially available audio frequency recording tape, but approximately two inches wide.

(2) Magnetic head assembly 100—250 head units made as shown in FIGURES 4–7 from a sheet 200 of "Permalloy" having a thickness of .002 inch, a height of .125 inch and a length of two inches; strip 130 of glass fiber reinforced epoxy.

(3) Gap spacer 108—copper strip of .00025 inch thickness.

(4) Direction of tape movement—first over individual poles 100*a*–100*e* and then over common pole of core 101.

(5) Tape speed—approximately 15 inches per second.

(6) Recording circuit—head unit electric circuit as shown in FIGURE 6 with switch 83 closed; signal source 37 supplying a standard television picture signal having a line rate of 15,750 cycles per second and 60 fields (interlaced)—30 frames per second, and having conventional horizontal and vertical blanking signals, with the picture signal subjected to an equalization circuit of conventional design emphasizing the high frequencies to give an efficient recording current in the head windings particularly at these high frequencies.

(7) Playback circuit—head electric circuit as shown in FIGURE 6; and signal source 37 providing a constant voltage level during active scans and horizontal and vertical blanking signals during retrace intervals of the scanning beam.

(8) Photo-grid conductors 142–144, 151–153 are formed of indium metal, evaporated through a thin photoetched mask, and are microsoldered to wires 112*a*–115*a* using indium solder.

(9) Magnetic recording bias—direct current bias utilizing direct current saturation by means of head 60 and selection of the desired direct current operating point by means of source 27, FIGURE 6.

(10) Vertical deflection of cathode ray beam by means of a 20 megacycles per second sine wave.

(11) Horizontal and vertical sweep amplitudes to give a 2.5 inch square pattern on the tube face 36.

Although an example of a preferred photoconductive construction has been described in detail, it will be apparent to those skilled in the art that the sensitive grid may also be constructed of small p–n junctions, barrier layers, and of other materials as previously mentioned.

The simple equalizer described is illustrative of the general characteristic desired. Other or more elaborate networks may be designed for an even closer fit to the desired response.

Along each of the recorded channels on the record medium the waveform corresponds to the light modulation along a vertical line of the television picture fields. It is obvious that the maximum frequency that need be handled by one channel is 15,750 cycles per second since this is the number of horizontal lines per second that intersect any vertical line. The system need not be confined to this format, and others are possible.

To give a rough estimate of the illumination falling on the photogrid using the National Video type 5BKPV–1 cathode ray tube with P16 phosphor, an illumination of one-half foot candle was measured utilizing a Luckiesh and Taylor brightness meter made by the General Electric Company. In the experimental arrangement utilizing this cathode ray tube described herein, only a low level of ordinary light was present and no special bias light source such as indicated at 184 was utilized.

By way of example of an arrangement for compensating for irregularities in the photo-grid during playback, if the photoconductive material 150 is more sensitive on one side thereof as compared to the other due to irregularities in manufacture, for compensation a bias waveform is applied by signal source 37 between the control electrode 38 and cathode 39 which increases the beam intensity when scanning the region corresponding to the less sensitive side of the photoconductive material. The compensation or bias waveform applied to the picture signal components of the successive lines of the television signal which are supplied by signal source 37 to control electrode 38 can be tailored to compensate for more complex variations in the sensitivity of the photoconductive layer 150 by conventional means as will be apparent to those skilled in the art.

As indicated in FIGURE 6, during the playback operation, the output load may comprise either transformer 92 or an output load resistor 260 as determined by the position of switch 261. With the switch 261 in the position shown, the output signal is delivered from the secondary 95 of transformer 92 to an equalizing network indicated at 250 in FIGURE 3. The output of the equalizer network 250 is connected to the input of a preamplifier, and the output of the preamplifier includes further equalization. The equalization is preferably distributed so that the maximum equalizer loss in each equalizer section is approximately proportional to the gain of the associated amplifier. Thus, the loss in the equalizer section 250 would be roughly proportional to the gain in the preamplifier stage following the equalizer section 250. Exactly the same type of equalizer and preamplifier arrangement is indicated in FIGURE 6 for the case of utilization of a load resistor 260 in the output circuit of the playback system. Thus, with switch 261, FIGURE 6, in the left hand position, the bias source 96 may be connected with switch 97 open. The negative terminal of battery 96 may be grounded. The first equalizer stage may have a series capacitor 263 followed by shunt resistor 264 having one terminal 264*a* connected to ground. This equalizer is connected to the input of a preamplifier 266 having an amplification generally proportional to the maximum equalizer loss in equalizer section 263, 264. A second RC equalizer section is shown connected to the output of preamplifier 266 and may comprise a capacitor 268 followed by resistor 269 with its terminal 269*a* connected to ground. The amplifier stage following the second equalizer section may have an amplification generally proportional to the maximum loss in the second equalizer section. For adjustment of low frequency response, resistors 270 and 271 are shown connected across capacitors 263 and 268.

Equalization rising from three to twelve decibels per octave may be useful over a frequency range from about one kilocycle per second to ten megacycles per second, a rise of 6 db per octave being considered advantageous from 10,000 cycles to 5 megacycles. An example of an equalizer giving a rising response might comprise a series capacitor 263 of 500 micromicrofarads and a shunt resistor 264 of 5000 ohms, with a 100,000 ohm resistor substituted for variable resistor 270 across capacitor 263 and with a further equalizer section provided subsequent to preamplifier 266. The equalization would be distributed such that the maximum equalizer loss in each equalizer section would be somewhat proportional to the gain of the succeeding amplifier stage. A rise of 6 db per octave is considered advantageous in the frequency band including 15,000 cycles.

The output circuitry of the playback system of the present invention may comprise an integrating circuit or other means for providing an output signal proportional to magnetic flux from the record medium rather than proportional to rate of change of such flux where windings are used on the playback head units instead of flux responsive elements such as a Hall elements. Such integrating circuit or other means may be used in place of the equalizer circuits such as 250; 263; 264; 270; and 268, 269, 271, or may be used following a stage of amplification having its input connected across the second equalizer stage, for example across resistor 269.

Where it is desired to use a relatively high bias voltage for source 27 during recording, for example in order to obtain a relatively high amplitude of signal current variation, a bias winding may be provided on the common core 101 which receives a steady direct current of polarity to produce a magnetic bias flux in the head units at least partially offsetting the effect of the average direct current supplied to the head unit windings 112–116 by source 27.

On the other hand where the average bias current produced by source 27 is below a desired level, additional bias flux may be produced in the head units by supplying aiding direct current to a bias winding on the common core 101.

The other features of the preferred system given herein may be of a conventional nature such as would be obvious to those skilled in the art. Thus, a recording and playback head may be provided at one margin of the tape 10 with its longitudinal gap in transverse alignment with the longitudinal gaps of the head units defined by the spacer 108. This recording and playback head may record on the tape 10 a suitable synchronizing signal such as the horizontal sweep signal supplied to the horizontal deflection circuit of the cathode ray tube 33 during recording. During playback, the same recording and playback head may reproduce the recorded control signal and the reproduced control signal may be utilized to control the movement of the tape 10 in the direction of the arrow 11 so that the head assembly exactly scans the recorded signal on the tape line for line. Alternatively the reproduced control signal may be utilized to control the horizontal deflection circuits of the cathode ray tube 33 during playback. The circuitry for accomplishing these functions forms no part of the present invention and is of a conventional nature and will be apparent to those skilled in the art.

By way of example, where playback should be carried out with a precise horizontal sweep rate of 15,750 cycles per second as in broadcasting of the reproduced signal, a comparator may have its inputs connected respectively to the output of a precisely controlled horizontal sweep generator and to the output of the control recording and playback head, and any error signal from the comparator may control the speed of a capstan motor driving the tape to maintain a precise scanning relationship between the video playback head and the recorded video signal on the tape. The horizontal sweep generator would have its output connected to the horizontal deflection electrodes of the cathode ray tube 33 and to the circuits controlling the horizontal sweep in the visual display of the reproduced signal.

Where the frequency of the horizontal sweep generator need not be precisely 15,750 cycles per second, the tape may be driven at constant speed and the horizontal synch signal reproduced from the control channel on the tape may be used to control the frequency of the horizontal sweep generator. The output of the horizontal sweep generator would be connected both to the horizontal deflection electrodes of the cathode ray tube 33 and to the video display device receiving the reproduced picture signal, such as an ordinary television receiving set.

An audio recording and playback head may have a longitudinal gap aligned with the gap spacer 108 and cooperate with a second channel of the record medium along one margin thereof. The audio signal recorded on the tape will thus correspond in time with the laterally adjacent recorded line of the television signal for ease of editing. The audio head during playback operation will reproduce the audio signal simultaneous with reproduction of the recorded picture signal. The video section of the head may be somewhat less than 2 inches wide so as to provide space for audio and control channels on a 2 inch wide tape.

A feature of the present invention resides in the provision of a cadmium sulfide or cadmium selenide photoconductive material utilized in an output circuit having a characteristic where the voltage or current output rises in direct proportion to frequency in a high frequency band extending substantially above the normal useful upper limit of 250 cycles per second for these materials and at least up to frequencies of the order of 15,000 cycles per second.

*Summary of operation*

Summarizing the operation of the illustrated system, during recording switch 190, FIGURE 6, is in the left hand position. Signal source 37, FIGURE 1, supplies a picture signal to the control grid 38 of the cathode ray tube 33, FIGURE 1, during successive scans of the cathode ray beam of the tube to produce successive light patterns such as indicated at 34*a*–34*g* at face 36 of the cathode ray tube 33. These light patterns 34*a*–34*g* are directed by lens 40, FIGURE 1, onto the photoconductive regions such as 30 and 31 in FIGURE 1 or 161–166 in FIGURE 5 to successively activate the head unit electric circuits comprising conductors 15*a*–21*a* in FIGURE 1 and comprising windings 112–116 in FIGURE 6. The modulation of the intensity of the light patterns represented by the successive lines 34*a*–34*g* in FIGURE 1 results in a corresponding variation in the impedance of the successive photoconductive regions to modulate the magnetic recording fields produced at the successive head units 15–21, FIGURE 1, or 100*a*–100*e*, FIGURE 4. The resultant pattern on the tape 10 is indicated diagrammatically in FIGURE 1, a line of magnetization on the tape produced by head units 15–21 being indicated at 50–56. A similar line of magnetization is diagrammatically indicated at 192–196 for the head units 100*a*–100*e* in FIGURE 4.

During playback, switch 190, FIGURE 6, is in the right hand position to provide a circuit similar to that of FIGURE 3. Signal source 37, FIGURE 1, supplies a constant voltage level during successive active scans of the cathode ray beam of tube 33 to successively activate photoconductive regions such as 30 and 31, FIGURE 3 or 161–166, FIGURE 5, to activate the successive head units 15–21, FIGURES 1 and 3 or 100*a*–100*e*, FIGURE 4, for reproducing the signal recorded on the tape 10 during the recording operation.

The terms "modulating" and "variable amplitude" are utilized in the claims to refer to signals such as television signals whose amplitude is variable over a spectrum of values, and are used to exclude digital or on-off signals having only a zero or "off" value, and a "one" or "on" value. Thus the phrase "means for modulating the intensity of the radiant energy" requires that the intensity be variable by said means over a spectrum of values and not simply turned on and off.

It will be apparent that many modifications and variations may be effected without departing from the scope of the novel concepts of the present invention.

I claim as my invention:

1. A recording system comprising:
a series of head units for coupling to a record medium to record a variable amplitude signal thereon,
a series of electric circuits each coupled to one of said head units for producing variable recording field intensities in the record medium in accordance with the amplitude of current flow in the respective electric circuits,
said electric circuits each having a radiant energy responsive material controlling the amplitude of current flow therein and varying in impedance in accordance with the intensity of the radiant energy impinging thereon,
means for generating radiant energy capable of controlling the impedance of said radiant energy responsive material and for supplying said radiant energy to the radiant energy responsive material of each of said electric circuits in sequence, and
means for modulating the intensity of the radiant energy in accordance with a variable amplitude signal to be recorded to control the recording field intensities produced in the record medium by the successive head units of said series.

2. A recording system comprising:
a series of head units for coupling to a record medium to record a variable amplitude signal thereon,
a series of electric circuits each coupled to one of said head units for producing recording field intensities at the record medium in accordance with the amplitude of current flow in the respective electric circuits,
said electric circuits each having a radiant energy responsive material controlling the amplitude of current flow therein and varying in impedance in accordance with the intensity of the radiant energy impinging thereon,
means for generating radiant energy capable of controlling the impedance of said radiant energy responsive material and for supplying said radiant energy to the radiant energy responsive material of each of said electric circuits in sequence,
said radiant energy generating means comprising an electronic discharge device having a scanning beam for deflection along a predetermined path and a radiant energy emitting material disposed along said predetermined path for sequential energization of successive regions thereof by said scanning beam during deflection thereof,
said radiant energy emitting material emitting radiation of intensity which varies in accordance with the intensity of said scanning beam, said electric circuits being external to said discharge device,
said discharge device having a wall thereof permeable to said radiant energy and through which said radiant energy is supplied to said radiant energy responsive material of said electric circuits, and
means for modulating the intensity of the scanning beam in accordance with a variable amplitude signal to be recorded to correspondingly control the recording intensities produced in the record medium at the successive head units of said series.

3. A transducer head assembly comprising:
a series of transducer head units having respective head unit conductors for coupling to respective channels of a record medium for transducing signals between the form of a signal current flow in the head unit conductor and the form of a recorded signal field on the associated channel of the record medium,
said head unit conductors each having a region of photoconductive material connected in a direct current electric circuit therewith and controlling current flow therein and responsive to a change in the intensity of radiant energy impinging thereon to activate the associated head unit for carrying out a transducing operation with respect to the associated channel of the record medium, and
means for sequentially changing the intensity of radiant energy impinging on the regions of photoconductive material of the respective head units to sequentially activate said head units to carry out a transducing operation, wherein the improvement comprises
a record medium coupled to said head units capable of storing intelligence in the form of recorded fields of intensity which is variable over a continuous spectrum of values,
a signal source supplying intelligence as a variable amplitude signal assuming a multiplicity of different amplitude values and having frequency components in the megacycle range,
means for operating said sequentially changing means to activate said head units sequentially in each cycle and cyclically activating said head units at a scanning frequency of the order of 15 kilocycles per second,
said photoconductive material having response characteristics so as to be capable of activation and deactivation at said scanning frequency, and means connected with said head units and with said signal source for modulating the recording field intensities recorded on said record medium by the successive head units in accordance with the time variation of said variable amplitude signal including said frequency components in the megacycle range.

4. A transducer head assembly comprising:

a series of transducer head units having respective head unit conductors for coupling to respective channels of a record medium for producing recording field intensities in the record medium in accordance with the current flow therein, said head unit conductors each having a region of photoconductive material connected in a direct current electric circuit therewith and controlling current flow therein and responsive to a change in the intensity of radiant energy impinging thereon to activate the associated head unit conductor, means for sequentially changing the radiant energy intensity impinging on the regions of photoconductive material associated with the successive head units of said series to sequentially activate said head units, and means for modulating the recording field intensities produced by the successive activated head units in accordance with a variable amplitude signal to be recorded.

5. A transducer head assembly comprising:

a series of transducer head units having respective head unit conductors for coupling to respective channels of a record medium for producing an electric signal current in the respective head unit conductors in accordance with the signal fields recorded on the respective channels of the record medium, said head unit conductors each having a region of photoconductive material connected in a direct current electric circuit therewith and controlling current flow therein and responsive to a change in the intensity of radiant energy impinging thereon to activate the associated head unit conductor, means for sequentially changing the radiant energy intensity impinging on the photoconductive regions of the successive head units of said series to sequentially activate said head units, and signal output means connected with the head unit conductors of said head units for receiving the electric signal currents from the successive activated head units to deliver an output signal in accordance with the signal fields recorded on the channels of the record medium.

6. A transducer head assembly comprising:

a series of transducer head units having respective head unit conductors for coupling to respective channels of a record medium to produce recording field intensities in the record medium in accordance with variable amplitude signal current flow in the respective head unit conductors, said heat unit conductors each having a region of photoconductive material connected in a direct current electric circuit therewith and controlling current flow therein and responsive to a change in the intensity of radiant energy impinging thereon to activate the associated head unit conductor, a signal input means connected to the head unit conductors of the respective head units under the control of the respective regions of photoconductive material for supplying variable amplitude electric signal current to the activated head unit, and means for sequentially changing the intensity of radiant energy impinging on the regions of photoconductive material of the successive head units of said series to sequentially activate said head units so as to record the variable amplitude signal from the signal input means on the record medium.

7. A transducer head assembly comprising:

a series of transducer head units having respective head unit conductors for coupling to respective channels of a record medium and for producing a variable amplitude recording field intensity in the record medium in accordance with signal current flow in the associated head unit conductor.

said head unit conductors each having a region of photoconductive material connected in a direct current electric circuit therewith and controlling current flow therein in response to a change in the intensity of radiant energy impinging thereon to activate the associated head unit conductor, means for sequentially changing the intensity of radiant energy impinging on the regions of photoconductive material of the successive head units of said series to sequentially activate said head units, and means for modulating the intensity of the radiant energy impinging on the regions of photoconductive material of the successive head units in accordance with a variable amplitude signal to be recorded to modulate the current flow in the head unit conductors of the successively activated head units.

8. A magnetic recording head comprising:

a series of magnetic head units for coupling to respective channels of a magnetic record medium to record a signal thereon, a series of electric circuits each coupled to one of said head units for activating the head unit in response to current flow in the electric circuit, said electric circuits each having a region of photoconductive material therein and having an electric potential supply for producing an activating current flow in the electric circuit in response to a predetermined illumination of the photoconductive region associated therewith, a cathode ray tube having a scanning beam for producing a luminescent output external to said tube and impinging on the regions of photoconductive material of the successive head units of said series in sequence to sequentially activate said magnetic head units, and means for controlling the amplitude of the recorded field produced by the successive activated head units no the magnetic record medium in accordance with a signal to be recorded.

9. A transducer head assembly comprising:

a series of transducer head units having respective electric circuits for coupling to respective channels of a record medium for transducing signals between the form of a signal current flow in the electric circuits and the form of a recorded signal field on the record medium, said units having respective pairs of first and second elongated parallel conductors connected in the respective electric circuits and having elongated regions of photoconductive material controlling current flow between the first and second conductors of the respective pairs and thereby controlling the activation of the respective electric circuits, and radiant energy scanning means for generating a radiant energy scanning beam of elongated cross section for successively impinging on said elongated regions of photoconductive material to activate the electric circuits of the respective head units in sequence.

10. A multichannel recording system comprising:

a series of head units each having a head unit electrical conductor for producing a recording field at a channel of a record medium in response to current flow therein, a photo-grid comprising aseries of pairs of first and second conductors extendnig in parallel relation and having regions of photoresponsive material controlling the electrical impedance betwen said pairs of conductors and shiftable from a first impedance condition to a second impedance condition in response to the impingement of radiant energy thereon, means connected with said head unit electrical conductors under the control of the respective regions of photoresponsive material for supplying activating current flow to said electrical conductors in response to shifting of said regions of photoresponsive material to said second impedance condition, and means for supplying radiant energy to said regions of photoresponsive material of the successive head units of said series in sequence to successively activate said head units.

11. A multichannel magnetic transducer sysem comprising:

a series of magnetic head units having respective electric windings for coupling with respective channels of a magnetic record medium, a photo-grid having a series of pairs of first and second conductor means with the first conductor means being connected with one terminal on the respective electric windings by means of a continuous direct current path and having a series of regions of photoresponsive material interposed between the first and second conductor means of the respective pairs and controlling activating current flow to the respective electric windings, and means comprising a scanning light beam cyclically and sequentially impinging on said regions of photoresponsive material of the respective head units for cyclically and sequentially activating said head units.

12. A multichannel magnetic playback system comprising:

a series of magnetic head units each having a magnetic fluxresponsive element for coupling to respective channels of a magnetic record medium and for producing an electric output signal in response to signal flux from the associated channel of the record medium threading said magnetic fluxresponsive element, output electric circuit means for receiving the output signals from the magnetic fluxresponsive elements of the magnetic head units, a photo-grid having a series of pairs of first and second conductor means and having a series of photoresponsive regions between said first and second conductor means of the respective pairs and controlling electrical coupling between respective pairs of said first and second conductor means, means for connecting the respective magnetic fluxresponsive elements of the series of magnetic head units with the output electric circuit means under the control of respective pairs of said first and second conductor means, and scanning radiant energy producing means for cyclically directing a beam of radiant energy onto each of said photoresponsive regions in sequence to couple the magnetic fluxresponsive elements of successive head units of said series cyclically and in sequence to said output electric circuit means.

13. A magnetic recording and playback head assembly comprising:

a series of magnetic head units each having respective windings for coupling to respective channels of a magnetic record medium, a photo-grid having a series of pairs of first and second conductor means and having a series of photoresponsive regions between the first and second conductor means of the respective pairs for controlling electrical coupling between the respective pairs of first and second conductor means, scanning radiant energy means for cyclically directing a beam of radiant energy onto each of said photoresponsive regions in sequence to sequentially electrically couple the first and second conductor means of the successive pairs of said series, and means for connecting said windings of said magnetic head units with the respective pairs of first and second conductor means of the photo-grid for sequential activation of said windings during recording and playback operation and for producing a signal magnetic field at the successive head units in accordance with a signal to be recorded during recording operation and for receiving the signals produced in the windings of the successively activated head units during playback operation.

14. A recording and playback system comprising:

a series of head units for coupling to a record medium to record and playback signals thereon, a series of electric circuits each coupled to one of said head units for producing recording intensities at the head units in accordance with the amplitude of current flow in the respective electric circuits during recording and for producing an output signal current in accordance with magnetic signal flux threading said head units during playback operation, said electric circuits each having a radiant energy responsive material controlling the amplitude of current flow therein and varying in impedance in accordance with the intensity of the radiant energy impinging thereon, means for generating radiant energy capable of controlling the impedance of said radiant energy responsive material and for supplying said radiant energy to the radiant energy responsive material of each of said electric circuits in sequence, means for modulating the intensity of the radiant energy in accordance with a signal to be recorded to correspondingly control the recording intensities produced at the successive head units of said series during recording, and means for maintaining said radiant energy at about a constant intensity level during successive scans of the radiant energy responsive material of the electric circuits during playback operation to successively activate said electric circuits.

15. A recording and playback system comprising:

a series of head units for coupling to a record medium to record a signal thereon during a recording operation and to reproduce a signal recorded on the record medium during a playback operation, a series of electric circuits each coupled to one of said head units for producing recording intensities at the head units in accordance with the amplitude of current flow in the respective electric circuits during recording operation and for producing a signal current therein in accordance with a signal recorded on the record medium during a playback operation, said electric circuits each having a radiant energy responsive material controlling the amplitude of current flow therein and varying in impedance in accordance with the intensity of the radiant energy impinging thereon, means for generating radiant energy capable of controlling the impedance of said radiant energy responsive material and for supplying said radiant energy to the radiant energy responsive material of each of said electric circuits in sequence, said radiant energy generating means comprising an electronic discharge device having a scanning beam for deflection along a predtermined path and a radiant energy emitting material disposed along said predetermined path for sequential energization of successive regions thereof by said scanning beam during deflection thereof, said radiant energy emitting material emitting radiation of intensity which varies in accordance with the intensity of said scanning beam, said electric circuits being external to said discharge device, said discharge device having a wall thereof permeable to said radiant energy and through which said radiant energy is supplied to said radiant energy responsive material of said electric circuits, and means for modulating the intensity of the scanning beam in accordance with a signal to be recorded during recording operation to correspondingly control the recording intensities produced at the successive head units of said series and for maintaining the intensity of the scanning beam during scanning of the successive electric circuits during playback operation.

16. A recording and playback system comprising:

a series of head units for coupling to a record medium to record a signal thereon during a recording operation and for reproducing a signal recorded on the record medium during a playback operation, said head units each having a radiant energy responsive region controlling activation of the head unit, means for generating radiant energy capable of activating the radiant energy responsive regions to activate the respective head units, means for controlling the recording field intensity of the activated head units in accordance with a signal to be recorded during recording operation, and means for coupling to the activated head units of said series during a playback operation to electrically reproduce the signals recorded on the record medium.

17. A recording and playback system comprising:

a series of head units for coupling to a record medium to record a signal thereon during a recording operation and to electrically reproduce a signal recorded on the record medium during a playback operation, said head units having respective regions of photoconductive material controlling activation thereof to carry out said recording and playback operations, an electronic discharge device having a scanning beam for deflection along a predetermined path and a fluorescent material disposed along said predetermined path for generating light energy scanning said regions of photoconductive material to successively activate the same, said regions of photoconductive material being external to said discharge device, said discharge device having a wall thereof permeable to said light energy and through which said light energy is supplied to said regions of photoconductive material, and means for controlling the recording field intensities at the successive activated head units in accordance with a signal to be recorded during a recording operation and for receiving electric output signals from the successive activated head units in accordance with a signal recorded on the record medium during a playback operation.

18. A transducer system comprising:

a series of head units comprising respective magnetic core parts lying substantially in a common plane for coupling to respective channels of a magnetic record medium and disposed successively along a longitudinal axis of the head units extendling generally transversely to the direction of movement of the record medium, said magnetic core parts having respective diagonally extending portions extending at respective acute angles to planes extending at right angles to the plane of said core parts and at right angles to said longitudinal axis, and said head units having electrical windings linking said diagonally extending portions of said core parts and having respective turns thereof disposed in substantially parallel planes at right angles to the plane of said core parts and substantjally at right angles to said longitudinal axis of the series of head units.

19. A transducer system comprising:

a series of head units for coupling to a record medium and comprising respective core parts lying substantially in a common plane and disposed successively along a longitudinal axis of the head units extending generally transversely to the direction of movement of the record meduim, said head unit core parts comprising respective diagonally extending core portions extending at an acute angle to the longitudinal axis of the head units, said head units having respective electric windings encircling the diagonally extending portions of the respective core parts with the turns of the respective windings extending substantially parallel to each other and disposed in planes substantially at right angles to the plane of said core parts and substantially at right angles to the longitudinal axis of the head units, and a photoconductive grid comprising an area of photoconductive material lying substantially in a single plane and respective pairs of elongated parallel conductors extending parallel to each other and lying in a plane substantially parallel to said single plane of said photoconductive material and in contact therewith and electrically connected with the respective windings of said head units, said photoconductive material controlling electrical coupling between the respective pairs of conductors for controlling activation of said windings during a transducing operation.

20. A transducer head assembly comprising:

a series of transducer head units having respective head unit conductors for coupling to respective channels of a record medium for producing an electric signal in the respective head unit conductors in accordance with the signal fields recorded on the respective channels of the record medium, said head unit conductors each having a region of photoconductive material connected therewith and responsive to change in the intensity of radiant energy impinging thereon to activate the associated head unit conductor, means for sequentially changing the radiant energy intensity impinging on the photoconductive regions of the successive head units of said series to sequentially activate said head units, and signal output means comprising an equalizing circuit connected with the head unit conductors of said head units to deliver an output signal in accordance with the signal fields recorded on the channels of the record medium.

21. A transducer head assembly comprising:

a series of transducer head units having respective head unit conductors for coupling to respective channels of a record medium for producing an electric signal in the respective head unit conductors in accordance with the signal fields recorded on the respective channels of the record medium, said head unit conductors each having a region of photoconductive material connected therewith and responsive to a change in the intensity of radiant energy impinging thereon to activate the associated head unit conductor, means for sequentially changing the radiant energy intensity impinging on the photoconductive regions of the successive head units of said series to sequentially activate said head units, and signal output means comprising an equalizing circuit connected with the head unit conductors of said head units to deliver an output signal in accordance with the signal fields recorded on the channels of the record medium, said equalizing circuit having a frequency response characteristic rising at approximately 6 decibels per octave over a frequency range of the order of from 10,000 cycles per second to 5 megacycles per second.

22. A transducer head assembly comprising:

a series of transducer head units having respective head unit conductors for coupling to respective channels of a record medium for producing an electric signal in the respective head unit conductors in accordance with the signal fields recorded on the respective channels of the record medium, said head unit conductors each having a region of photoconductive material connected therewith and responsive to a change in the intensity of radiant energy impinging thereon to activate the associated head unit conductor, means for sequentially changing the radiant energy intensity impinging on the photoconductive regions of the successive head units of said series to sequentially activate said head units, and signal output means comprising an equalizing circuit connected with the head unit conductors of said head units to deliver an output signal in accordance with the signal fields recorded on the channels of the record medium, said signal output means comprising a first stage of the equalizing circuit, an amplification circuit following said first stage of the equalizing circuit and a second stage of the equalizing circuit following said amplification circuit, and said equalizing circuit providing a frequency response characteristic rising at approximately 3 to 12 decibels per octave over a substantial frequency range.

23. A recording and playback system comprising:

a series of head units for coupling to a record medium to record and playback signals thereon, a series of electric circuits each coupled to one of said head units for producing recording intensities at the head units in accordance with the amplitude of current flow in the respective electric circuits during recording and for producing an output signal in accordance with magnetic signal flux threading said head units during playback operation, said electric circuits each having a radiant energy responsive material controlling the amplitude of current flow therein and varying in impedance in accordance with the intensity of the radiant energy impinging thereon, means for generating radiant energy capable of controlling the impedance of said radiant energy responsive material and for supplying said radiant energy to the radiant energy responsive material of each of said electric circuits in sequence, means for modulating the intensity of the radiant energy in accordance with a signal to be recorded to correspondingly control the recording intensities produced at the successive head units of said series during recording, and means for varying the intensity of said radiant energy in a predetermined manner during each scan of the radiant energy responsive material of the electric circuits to compensate for irregularities in the radiant energy reseponsive material associated with the successive electric circuits during playback operation.

24. A transducer head assembly comprising:

a series of transducer head units having respective head unit electric circuits for coupling to respective channels of a record medium for producing electric signals in the respective head unit electric circuits in accordance with the signal fields recorded on the respective channels of the record medium, said head unit electric circuits each having a region of photoconductive material connected therewith and responsive to a change in the intensity of radiant energy impinging thereon to activate the associated head unit, means for sequentially changing the radiant energy intensity impinging on the photoconductive regions of the successive head units of said series to sequentially activate said head units, and signal output means connected with the head unit electric circuits of said head units to deliver an output signal in accordance with the signal fields recorded on the channels of the record medium.

25. A transducer head assembly comprising a series of transducer head units having respective head unit electric circuits for coupling to respective channels of a record medium for reproducing an electric signal in accordance with the signal fields recorded on the respective channels of the record medium, said head unit electric circuits each having a region of photoconductive material connected therewith and responsive to a change in the intensity of light energy impinging thereon to activate the associated head unit electric circuit, means for sequentially changing the light energy intensity impinging on the photoconductive regions of the successive head units of said series to sequentially activate said head units, and signal output means comprising a circuit connected with the head unit electric circuits of said head units and having a characteristic where the output therefrom rises in direct proportion to frequency in a frequency band including frequencies at least of the order of 15,000 cycles per second.

26. A transducer head assembly comprising a series of transducer head units having respective head unit electric circuits for coupling to respective channels of a record medium for reproducing an electric signal in accordance with the signal fields recorded on the respective channels of the record medium, said head unit electric circuits each having a region of photoconductive material connected therewith and responsive to a change in the intensity of light energy impinging thereon to activate the associated head unit electric circuit, means for sequentially changing the light energy intensity impinging on the photoconductive regions of the successive head units of said series to sequentially activate said head units, and signal output means comprising a circuit connected with the head unit electric circuits of said head units and having a characteristic where the output therefrom rises in direct proportion to frequency in a frequency band including frequencies at least of the order of 15,000 cycles per second, said regions of photoconductive material being selected from the group consisting of cadmium sulfide and cadmium selenide photoconductive material.

27. A recording system comprising:

a series of head units for coupling to a record medium to record intelligence thereon, a series of electric circuits each coupled to one of said head units for recording on the record medium in response to current flow therein;

said electric circuits each having a radiant energy responsive material controlling current flow therein, means for generating radiant energy capable of controlling the current flow in said radiant energy responsive material and for supplying said radiant energy to the radiant energy responsive material of each of said electric circuits in sequence, wherein the improvement comprises a record medium coupled to said series of head units capable of storing intelligence in the form of recorded fields of intensity which is variable over a continuous spectrum of values, means for operating said radiant energy generating means to activate said head units sequentially in each cycle and for cyclically activating said head units at a scanning frequency of the order of 15 kilocycles per second, and means connected with said head units for modulating the recording field intensities recorded on said record medium by the successive head units in accordance with a variable amplitude signal.

28. The transducer head assembly of claim 5 with a record medium having respective channels thereof coupled to said transducer head units and having recorded fields thereon of variable intensity capable of stimulating current flow in said head unit conductors in accordance with a variable amplitude signal recorded thereon.

29. The transducer head assembly of claim 28 with said record medium having a variable amplitude video signal recorded thereon with a line scanning rate of the order of 15 kilocycles per second, and means for moving said record medium at a speed to produce an output signal in said signal output means having said line scanning rate of the order of 15 kilocycles per second.

30. The transducer head assembly of claim 29 with said signal output means comprising a circuit having a response characteristic where the output therefrom rises in direct proportion to frequency in a frequency band including frequencies at least of the order of 15 kilocycles per second.

31. The transducer head assembly of claim 30 with said regions of photoconductive material being selected from the group consisting of cadmium sulfide and cadmium selenide photoconductive material.

32. The transducer head assembly of claim 5 with said photoconductive material being in the form of a layer with electrically conductive strips thereon dividing the layer into the regions controlling current flow in the respective head unit conductors.

33. The transducer head assembly of claim 32 with each region of photoconductive material having a length dimension of the order of 2½ inches, and said sequentially changing means being operative to change the radiant energy intensity impinging on substantially said length dimension of each region in sequence to sequentially activate said head units.

34. The transducer head assembly of claim 33 with said sequentially changing means comprising a cathode ray tube having a scanning beam for producing a luminescent output external to said tube and impinging substantially on the entire length dimension of each photoconductive region in succession to sequentially activate said head units.

35. The transducer head assembly of claim 34 with said cathode ray tube supplying a beam of sheet configuration, the beam of sheet configuration having a cross section with a length dimension of the order of 2½ inches.

36. The transducer head assembly of claim 34 with said cathode ray tube having first deflection means for deflecting the scanning beam to scan each of said conductive regions in succession, and the cathode ray tube having second deflection means for deflecting the beam in a transverse direction, and means connected with said second deflection means for cyclically deflecting the beam transversely over a path having a length of the order of 2½ inches so as to excite substantially the entire length dimension of each photoconductive region in succession during each scanning cycle.

37. The multichannel magnetic playback system of claim 12 with a magnetic record medium having respective channels thereof coupled to said magnetic head units and having a variable amplitude video signal recorded thereon with a line scanning rate of the order of 15 kilocycles per second, and means for moving said magnetic record medium at a speed to produce the recorded variable amplitude video signal in said output electric circuit means with said line scanning rate of the order of 15 kilocycles per second.

38. The multichannel magnetic playback system of claim 37 with said output electric means comprising a circuit having a response characteristic where the output therefrom rises in direct proportion to frequency in a frequency band including frequencies at least of the order of 15 kilocycles per second.

39. The multichannel magnetic playback system of claim 38 with said photoresponsive regions being of photoconductive material selected from the group consisting of cadmium sulfide and cadmium selenide.

40. The multichannel magnetic playback system of claim 12 with said photogrid comprising a layer of photoconductive material and said pairs of first and second conductor means comprising strips of electrically conductive material dividing the layer into said series of photoresponsive regions.

41. The multichannel magnetic playback system of claim 40 with each of said photoresponsive regions having a length dimension of the order of 2½ inches, and said scanning radiant energy producing means producing a beam of radiant energy impinging on said regions over a length thereof of the order of 2½ inches.

42. The multichannel magnetic playback system of claim 40 with said scanning radiant energy producing means comprising a cathode ray tube having a scanning beam of effective sheet configuration, the beam having a cross section with a length dimension of the order of 2½ inches for producing a luminescent output external to said tube and impinging on said length dimension of each said photoresponsive regions in succession to sequentially activate said series of magnetic head units.

References Cited by the Examiner

UNITED STATES PATENTS

| | | | |
|---|---|---|---|
| 2,657,377 | 10/1953 | Gray | 178—6.6 |
| 3,205,302 | 9/1965 | Quada | 178—6.6 |

DAVID G. REDINBAUGH, *Primary Examiner.*

H. W. BRITTON, *Assistant Examiner.*